Nov. 12, 1929.     F. W. WOOD     1,735,706
CONTROLLER FOR ELECTRIC INDICATORS
Filed April 20, 1923     2 Sheets-Sheet 1
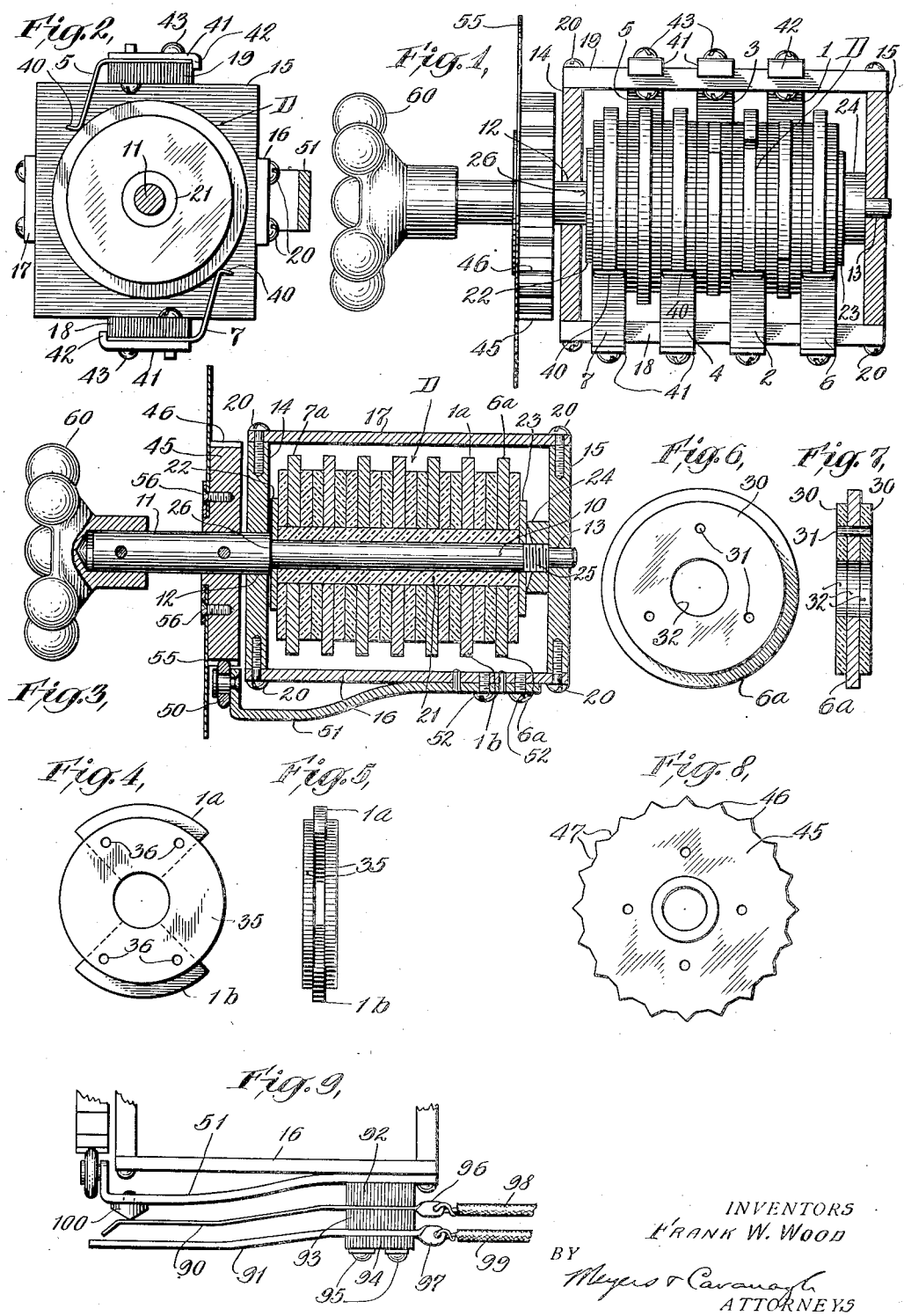
INVENTORS
FRANK W. WOOD
BY
Meyers & Cavanagh
ATTORNEYS

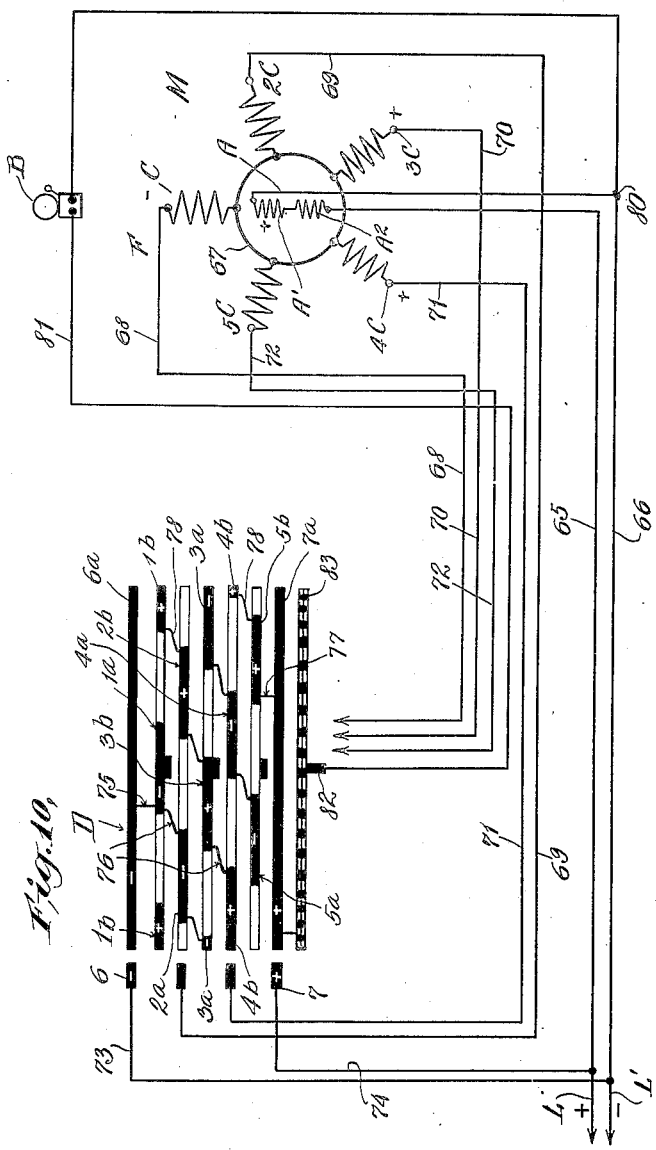

Patented Nov. 12, 1929

1,735,706

UNITED STATES PATENT OFFICE

FRANK W. WOOD, OF MONTCLAIR, NEW JERSEY, ASSIGNOR TO CHAS. CORY & SON, INCORPORATED, OF NEW YORK, N. Y., A CORPORATION OF NEW YORK

CONTROLLER FOR ELECTRIC INDICATORS

Application filed April 20, 1923. Serial No. 633,558.

My invention relates to a transmitter, or circuit controller for electric indicators, and especially for multipolar indicator motors of the general type disclosed in patents to Frank W. Wood, No. 1,396,803, November 15, 1921, and No. 1,408,555, March 7, 1922, and also an application of Frank W. Wood for electrical indicator motor, Serial No. 467,409, filed May 6, 1921. Transmitters or controllers suitable for indicator motors of the type referred to are disclosed in the patent to Frank W. Wood, No. 1,100,860, June 23, 1914, and also in the above mentioned application of Frank W. Wood.

The general object of the present invention is to provide a controller suitable for indicator motors of the type referred to, and which is an improvement upon the controllers or transmitters of types also above referred to, especially in the respects that the present controller is simpler, more easily and cheaply manufactured, and more compact, so that it occupies very much less space.

My invention consists, generally, in a controller which comprises a laminar drum structure in which selective contact conductor elements alternate with insulator elements, with a suitable arrangement of stationary brushes, preferably an arrangement in which alternate brushes are located on opposite sides of the drum structure, whereby a maximum degree of compactness may be secured.

The invention comprises, in connection with the general plan of arrangement above mentioned, a suitable arrangement of contact segments on the drum or rotor and suitable connections therefor, and various other structural features sufficiently explained hereafter.

The accompanying drawings show certain representative embodiments of the invention. After considering these, persons skilled in the art will understand that many variations may be made within the principles of the invention, and I contemplate the employment of any structures that are properly within the scope of the appended claims.

Figure 1 is a side elevation of the transmitter or controller with certain parts sectioned or broken away.

Figure 2 is a front end elevation with the handle and a front frame plate removed.

Figure 3 is a longitudinal section.

Figure 4 is a face view of one of the rotary contact segment units.

Figure 5 is an edge view of the same.

Figure 6 is a face view of one of the continuous, circular, or main circuit contacts.

Figure 7 is an edge view of the same.

Figure 8 is a face view of the stop or detent disk.

Figure 9 is a detail view of a modification providing a mechanically operated contact for a bell or other signal circuit.

Figure 10 is a diagram showing the circuit arrangements and also a modification in which the bell circuit is operated merely by electrical contacts.

The moving contacts are arranged as parts of a composite rotary or drum controller D mounted on the portion 10, of reduced diameter, of a shaft 11. The shaft has bearings at 12 and 13 in a front frame plate 14 and a rear frame plate 15, which are conveniently of square outline and are connected by longitudinal strips or frame members 16, 17, 18 and 19, which may be riveted or else detachably secured to the plates by screws 20. Connectors or frame members 16 and 17 may be flat metal strips and the connectors 18 and 19 are preferably of insulating material such as fibre or any of the molded synthetic compositions.

The movable contacts composing the drum D are constructed and arranged as follows: A sleeve 21 of suitable insulating material is placed on shaft portion 10. Various contact units are placed on the insulating sleeve and secured between washers 22 and 23 by a nut 24 engaging a screw threaded portion 25 of the shaft. Washer 22 is desirably located against a shoulder 26 formed on the shaft adjacent to its bearing in plate 14. One of the continuous or main circuit contact units is shown in Figures 6 and 7. This consists of disks 30 of any suitable insulating material, between which is placed a disk 6$^a$ of suitable metal, such as copper, and the three disks are secured together by suitable means such as pins or rivets 31. Registering holes 32 are bored in all of the disks so that they may be fitted as a unit over sleeve 21. One of these units including a circular contact $6^a$ is shown in Figure 3 located at one end of the drum and a similar unit, including a circular contact $7^a$, is located at the other end of the drum. Between the circular or continuous contact units are segmental contact units, each of which, as shown in Figures 4 and 5, consists of disks 35 of suitable insulating material suitably recessed to receive segmental metal contacts identified in this instance as $1^a$ and $1^b$. The members of this unit may be suitably held together by pins or rivets 36, and the members or the entire unit is suitably apertured to fit over the insulating sleeve. A suitable plurality of these segment units are located on the sleeve between the continuous contact units, and the entire drum structure is held together by nut 24, and relative rotation of the respective contact units may be prevented by dowel pins inserted between them or in any other suitable or convenient way. The different contact segment units are disposed on the shaft in circumferentially staggered arrangement to provide the proper circuit control for an indicator motor, and also with due regard to the arrangement of the brushes at opposite sides of the drum, as will be sufficiently understood from the following explanation of the circuit diagram.

To cooperate with the segmental rotary contacts, various brushes are arranged on the stationary frame work, and to enable the appliance to be made very short and compact in the lengthwise direction, and at the same time to enable the brushes to be made of substantial width, they are preferably located at opposite sides of the drum. Specifically in the present instance brushes in the form of "fingers" or strips of spring metal 2 and 4 are located on one of the insulating strips 18 and the other brushes 1, 3 and 5 are located on insulating strip 19. The brushes are suitably bent to extend inward toward the drum and are bent outward as at 40 near their free ends so that substantially opposite brushes, such as 2 and 3, for example, bear on their respective rotary contact segments at opposite points. Each brush may be secured to its respective insulating strip by a clip 41 having an angular member 42 to engage one edge of the insulating strip, and screws 43.

The brushes are of course positioned, as clearly shown in Figure 1, so that the engaging part of each brush has a substantially central bearing on the corresponding rotary segments, the operative relation of the brushes and segments being fully explained hereafter in connection with the circuit diagram.

Similar brushes or fingers 6 and 7, which may be identified as the main circuit brushes may be secured to one of the insulating strips such as 18, or one of the brushes 6 or 7 may be secured to one of the insulating strips and the other may be secured to the other strip. In the present specific embodiment of the invention where there are five brushes cooperating with rotary contact segments, it is convenient to locate two of the brushes, such as 2 and 4, at one side of the drum, and the other three contacts, such as 1, 3 and 5, at the other side of the drum, and in that case the main circuit brushes 6 and 7 are conveniently located at the same side of the drum as the two segment contacts 2 and 4.

To hold the drum yieldably but with sufficient positiveness in any position in which it is placed, a detent disk 45 having peripheral teeth 46 with intervening spaces or notches 47, is pinned or otherwise fixed upon shaft 11 adjacent to frame plate 14. The toothed periphery of this detent disk is engaged by a roller 50 carried by a spring arm 51 secured to frame strip 16 by rivets or screws 52. The number of teeth or notches on the detent disk of course corresponds to the desired number of positions of the drum, which is twenty in the present instance, to correspond with one particular indicator motor of the general type above referred to, the characteristics of this indicator motor being sufficiently explained hereafter in connection with the circuit diagram.

A dial or indicator disk 55 is usually provided, and conveniently this may be secured to the outer face of detent disk 45 by rivets or screws 56. Any suitable handle 60 is secured to the outer end of the shaft for convenient rotation of the drum.

The circuit diagram, Figure 10, shows a flat development of the controller drum surface, and also diagrammatically illustrates an indicator motor M of the general type above referred to, with suitable circuit connections. The motor armature A may be in the nature of a permanent magnet, or it may be magnetized by oppositely wound coils $A'$ and $A^2$ in circuit with positive line L and negative line $L'$ through conductors 65 and 66. The multipolar field F consists of coils 1C, 2C, 3C, 4C and 5C. The coils all have one common terminal connection indicated in the diagram by a conductor 67, and the other terminal of each coil is connected to one of the stationary contacts identified by a similar numeral; thus, coil 1C is connected to brush 1 by conductor 68; coil 2C is connected to brush 2 at the opposite side of drum D by conductor 69; coil 3C is connected to brush 3 at the same side of the drum as brush 1 by conductor 70; coil 4C is connected to brush 4 at the same side of the drum as brush 2 by conductor 71, and coil 5C is connected to brush 5 at the same side of the drum as brushes 1 and 3 by conductor 72.

Main circuit brush 6 is connected to the negative line by conductor 73 and the other main circuit brush 7 is connected to the positive line by a conductor 74.

The segmental contacts may be connected to the main or continuous drum contacts in various ways but conveniently the segment connections are provided by means of wires located close to the insulated surface of the drum. Thus, the continuous contact disk $6^a$ is connected to segments $1^a, 2^a, 3^a, 4^a$ and $5^a$ by wires 75 and 76, the positions of the segments being such that short pieces of wire may connect each two adjacent segments. Since these wires lie against the insulated drum surface and below the level of the fixed brushes they do not need to be insulated, and may be easily attached by drilling the segments and soldering the wires in, or in any other convenient way. In a similar way, segments $5^b, 4^b, 3^b, 2^b$ and $1^b$ are connected to the continuous contact disk $7^a$ and to each other by wires 77 and 78. Contact segments $1^a, 2^a$, etc., are connected to the positive side of the line by engagement of contact 7 with contact disk $7^a$.

In the position of the drum indicated in Figure 10, field coil 1C is negatively energized by engagement of brush 1 with segment $1^a$; field coil 3C is positively energized by engagement of brush 3 with segment $3^d$, and field coil 4C is positively energized by engagement of brush 4 with segment $4^b$. Armature coil A' is thus attracted by coil 1C, while armature coil $A^2$ is attracted equally by field coils 4C and 3C, and centered between them, while coil A' is alined with coil 1C. A motor arranged as diagrammatically indicated is capable of positioning the armature in twenty different positions by suitable positive and negative energization of different ones of the field coils as fully explained in the above-mentioned patents and applications, and the pairs of conductor segments are disposed in progressively staggered arrangement on the controller as herein shown so that by successive step-by-step movements the motor circuits are properly controlled to give 20 different positions or indications. By suitable modifications of the segment lengths and positions, or the number of segments and brushes, provision may be made for controlling an indicator motor of generally similar character to assume only ten different positions, that is to say, to give a corresponding number of indications or signals; and similarly, by the provision of a suitable number and arrangement of segments and brushes, motors having a different number of field poles or coils may be suitably controlled.

It is desirable in many cases to provide an audible or other suitable signal in addition to the visual signal controlled by the motor, at the motor or indicator station. Such a signal is provided for in the present invention in the form of a bell B, Figure 10. This may be an ordinary vibrator bell connected with the negative line through conductor 66 at the point 80, and also connected by conductor 81 and stationary contact 82 cooperating with a contact disk 83 to the negative line through the continuous contact disk $7^a$. The bell ringing contact disk 83 in this case is made up after the plan of a commutator with a plurality of insulating segmnets interposed between the metallic segments on its periphery, and the disk is arranged so that when the drum is in stationary position, as normally held by the detent roll 50, contact 82 is on an insulated segment. Whenever the drum is moved, however, contact 82 engages one or more of the metallic segments and the bell rings to call the attention of an attendant at the indicating station to the fact that an order has been indicated by the operation of motor M.

Figure 9 shows another arrangement of the bell circuit in accordance with which a flexible contact member or metallic strip 90 and a relatively rigid contact strip 91 are mounted adjacent to the flexible detent arm 51. The contact strips or members 90 and 91 may be spaced apart and secured by blocks 92, 93 and 94 of insulating material secured to frame member 16 by rivets or screws 95. The contacts 90 and 91 are provided with any suitable terminals, such as eye terminals 96 and 97, for the connection of suitable conductors 98 and 99 included in the bell circuit. A button 100 of insulating material is secured on detent arm 51 in engagement with flexible contact member 90, so that whenever the drum is moved the corresponding movement of the detent arm causes the flexible contact 90 to engage contact 91 and ring the bell.

I claim:

1. In a controller of the class described, a drum including a shaft, a sleeve of insulating material fitting thereon, a plurality of independent contact units mounted on the sleeve, each including insulating washers and connected contact elements between the washers and extending beyond the peripheries thereof, the elements of the end units being disks, and the elements of the intermediate units being oppositely arranged independent segments, each unit having an opening to receive the sleeve, and means to clamp the units on the shaft.

2. In a controller of the class described, a drum including a shaft, a sleeve of insulating material fitting thereon, a plurality of independent contact units mounted on the sleeve, each including insulating washers and connected contact elements between the washers and extending beyond the peripheries thereof, the elements of the end units being disks, and the elements of the intermediate units being oppositely arranged independent segments, each unit having an opening to receive the sleeve, and means to clamp the units on the shaft, a support for the drum in which the shaft is journaled, a brush for each element carried by the support, the brushes of the end elements adapted for connection with circuit terminals, and interconnections between certain of the segments and the end elements, whereby a plurality of circuits through the controller may be selectively made and broken upon rotation of the drum.

3. In a controller of the class described, a drum including a shaft, a sleeve of insulating material fitting thereon, a plurality of independent contact units mounted on the sleeve, each including insulating washers and connected contact elements between the washers and extending beyond the peripheries thereof, the elements of the end units being disks, and the elements of the intermediate units being oppositely arranged independent segments, each unit having an opening to receive the sleeve, and means to clamp the units on the shaft, a support for the drum in which the shaft is journaled, a brush for each element carried by the support, the brushes of the end elements adapted for connection with circuit terminals, and interconnections between certain of the segments and the end elements, whereby a plurality of circuits through the controller may be selectively made and broken upon rotation of the drum, means to hold the drum in adjusted position including a toothed wheel on the shaft and a spring supported roller cooperating with the wheel, and mechanism operated by the roller for closing an auxiliary circuit, including a pair of contacts, one of which is resilient and engaged by the roller to be moved toward the other when the roller is moved by the teeth of the wheel.

Signed at New York city, in the county of New York and State of New York, this 18th day of April, A. D. 1923.

FRANK W. WOOD.